United States Patent
Schmiedle et al.

(10) Patent No.: US 8,915,341 B2
(45) Date of Patent: Dec. 23, 2014

(54) CURRENT COLLECTOR AND ENERGY TRANSMISSION SYSTEM

(75) Inventors: Andreas Schmiedle, Loerrach (DE); Melchior Zumbach, Lenzburg (CH)

(73) Assignee: Conductix-Wampfler GmbH, Weil am Rhein-Markt (DE)

( * ) Notice: Subject to any disclaimer, the term of this patent is extended or adjusted under 35 U.S.C. 154(b) by 298 days.

(21) Appl. No.: 13/201,905

(22) PCT Filed: Feb. 5, 2010

(86) PCT No.: PCT/EP2010/051438
§ 371 (c)(1),
(2), (4) Date: Oct. 24, 2011

(87) PCT Pub. No.: WO2010/097278
PCT Pub. Date: Sep. 2, 2010

(65) Prior Publication Data
US 2012/0037471 A1    Feb. 16, 2012

(30) Foreign Application Priority Data

Feb. 24, 2009 (DE) .................. 10 2009 010 122

(51) Int. Cl.
*B60L 5/00* (2006.01)
*B60L 5/36* (2006.01)
*B60L 5/12* (2006.01)

(52) U.S. Cl.
CPC ............... *B60L 5/36* (2013.01); *B60L 2200/26* (2013.01); *B60L 5/12* (2013.01)
USPC .......................................................... 191/50

(58) Field of Classification Search
USPC ....... 191/45 R, 50, 51, 59, 59.1, 60, 60.2, 66, 191/67, 72, 73, 77, 78, 80, 82, 83
See application file for complete search history.

(56) References Cited

U.S. PATENT DOCUMENTS 3,730,312 A * 5/1973 Leger .............................. 191/66
4,034,832 A * 7/1977 Lewis .............................. 191/86

(Continued)

FOREIGN PATENT DOCUMENTS

DE    739960 C    11/1943
DE    891997 C    10/1953

(Continued)

OTHER PUBLICATIONS

International Search Report published Aug. 2, 2011 for PCT/EP2010/051438 filed Feb. 5, 2010.

(Continued)

*Primary Examiner* — Mark Le
*Assistant Examiner* — Jean Charleston
(74) *Attorney, Agent, or Firm* — Fleit Gibbons Gutman Bongini & Bianco PL; Martin Fleit; Paul D. Bianco

(57) ABSTRACT

The invention relates to a current collector 1 for a device 2 that can be displaced with and against the driving direction F along a conductor line 5, comprising a current collector cart 8 for the guided displacement along a guide element 9 of the conductor line 5, and an energy transmission system. The invention solves the problem of providing a current collector and an energy transmission system, which enable an energy-conserving, contact-reliable and damage-free displacement of the current collector along a conductor line and a simple connection of the current collector to the conductor line, in that at least one first lever assembly 12L between the current collector cart 8 and displaceable device 2 is provided with a first drive lever arm 13L, the first end of which can be connected in a rotatable manner to the displaceable device 2 and the second end of which is connected in a rotatable manner to a second end of at least one first tension lever arm 14L, the first end thereof being connected in a rotatable manner to a current collector cart, wherein a first adjustment drive 15L is provided in order to be able to move the current collector cart 8 between a retracted position on the displaceable device 2 and an extended position away from the displaceable device 2, and wherein a first locking device 16; 18L; 15L is provided, in order to lock the first drive lever arm 13L when displacing the displaceable device 2 in the driving direction F in a predetermined extended position.

11 Claims, 8 Drawing Sheets

(56) References Cited

U.S. PATENT DOCUMENTS

| | | | | |
|---|---|---|---|---|
| 4,194,603 | A | * | 3/1980 | Ross, Jr. .................. 191/23 A |
| 4,205,736 | A | * | 6/1980 | Seidl et al. .................. 191/70 |
| 4,229,000 | A | * | 10/1980 | Scherling .................. 482/24 |
| 4,471,175 | A | * | 9/1984 | Gronlund .................. 191/66 |
| 4,634,817 | A | * | 1/1987 | Griffiths et al. .................. 191/67 |
| 5,673,774 | A | * | 10/1997 | Trapp et al. .................. 191/49 |
| 6,796,410 | B2 | * | 9/2004 | Wilpsbaumer .................. 191/90 |
| 6,832,801 | B2 | * | 12/2004 | Zagoroff .................. 296/57.1 |
| 6,986,405 | B2 | * | 1/2006 | Meeker .................. 182/176 |
| 8,371,527 | B2 | * | 2/2013 | Girlich .................. 244/118.5 |

FOREIGN PATENT DOCUMENTS

| | | |
|---|---|---|
| DE | 1026776 B | 3/1958 |
| DE | 3417346 A1 | 11/1985 |
| DE | 4429268 A1 | 2/1996 |
| DE | 19647336 A1 | 5/1998 |

OTHER PUBLICATIONS

International Preliminary Report on Patentability published Aug. 30, 2011 for PCT/EP2010/051438, filed Feb. 5, 2010.

* cited by examiner

CURRENT COLLECTOR AND ENERGY TRANSMISSION SYSTEM

FIELD OF THE INVENTION

The invention pertains to a current collector and to an energy transmission system.

BACKGROUND OF THE INVENTION

Known energy transmission systems in the form of conductor line systems of the type known, for example, from DE 196 47 336 A1 feature devices that can be displaced on a conductor line, e.g., cable roller assemblies or transport suspension gears of an overhead conveyor. These devices frequently carry electrical loads such as driving motors for displacing the displaceable devices on the conductor line. In order to supply these electrical loads, current collectors with one or more sliding contacts are usually provided on one or more of the displaceable devices and can be inserted into corresponding voltage-carrying and current-carrying longitudinal line branches of the conductor line. In this case, the current collectors are rigidly connected to the displaceable devices and only the contacting of the sliding contacts with the line branches is realized in a movable fashion. Conductor lines of this type are normally used in manufacturing facilities that are accommodated in enclosed buildings. However, other types of conductor lines such as conductor rail systems or overhead contact systems known from railways may also be used for this purpose.

There is an increasing trend to also utilize conductor line systems in other systems with displaceable devices in order to supply electrical loads on the devices, for example, in cranes for loading containers or in RTG crane systems. In these systems, the loads arranged on the cranes are usually supplied via long lines that are wound onto and unwound from cable drums mounted on the cranes during a displacement. One example of such a cable drum arrangement is described in DE 44 29 268 A1. In order to displace the crane, the supply line is wound onto and unwound from the cable drum arranged on the crane in accordance with the movement of the loading crane. This known technique has the disadvantage that the line being wound and unwound needs to be placed on the ground without introducing significant tensile forces into the line. In addition, the line may become tangled while it is being wound or unwound such that the crane can no longer be displaced. In crane systems of this type with RTG cranes (Rubber Tired Gantry), the RTG cranes that are equipped with rubber tires and with a travel drive in the form of an internal combustion engine can be freely displaced in all directions. In the normal loading mode, the RTG cranes are positioned in longitudinal lanes between container loading berths and sort and load the containers in these loading berths. In order to quickly relocate containers in a full loading berth, RTG cranes are frequently pulled from currently empty or only slightly filled loading berths and driven to the full loading berth by means of the internal combustion engine. The electrical connection of the RTG cranes needs to be disconnected at the empty loading berth and reconnected at the full loading berth in a complicated, hazardous, and time-consuming fashion. In addition, the displacement of the RTG cranes by means of internal combustion engines is harmful to the environment and is becoming more and more expensive due to rising fuel prices, such that electric drives should be provided for movement within longitudinal lanes while the internal combustion engines should be used only for the free travel between the longitudinal lanes.

It would therefore be desirable, particularly in the field of crane systems, to supply the electrical loads on the crane with electric energy via a conductor line. However, since cranes of this type consist of very large systems that are typically used outdoors and therefore subjected to unfavorable ambient conditions, movements of the crane need to be decoupled as well as possible from movements of a current collector trolley that is connected to the crane and can be displaced on the conductor line.

One approach for this decoupling can be found in the field of rail-bound electric vehicles such as, for example, electric locomotives, in which one-leg pantographs or pantograph-type current collectors mounted on the roof of the locomotive usually can press a pantograph slipper against an overhead line. With respect to the supply of the vehicles with electric energy, it is particularly important that the pantograph slipper permanently contact the overhead line and this contact also be reliably maintained during motion-induced vibrations. The current collectors are therefore realized in such a way that a pressing mechanism reliably presses the pantograph slipper in the direction of the overhead line. This means that a force is continuously exerted in the direction of the overhead line.

One application of such pantograph-type current collectors in cranes is disclosed in DE 739 960 A. In this case, a double-link current collector is provided with a base plate, on which a skate is arranged by means of a double-link assembly with upper and lower link pairs in order to be guided along a conductor rail. The two lower links are connected to one another by means of a parallel motion such that their upper hinge points always carry out uniform motions, wherein the pressing force for the skate is generated by a tension spring that is arranged essentially parallel to the skate the between the upper links. An adjustment drive for retracting and extending the skate is not provided in this case.

Such a solution is very disadvantageous for conductor line current collector trolleys that are guided along a conductor line on a guide. In this case, a force needs to be continuously exerted transverse to the traveling direction, i.e., transverse to the longitudinal direction of the conductor line, such that the energy consumption increases. In addition, the constant pressing forces exerted transverse to the traveling direction leads to increased friction between the current collector trolley and the conductor line such that the energy consumption is additionally increased. Consequently, the displacement of the current collector trolley along the conductor line requires a significantly higher expenditure of force and energy. Since the current collector trolley is continuously pressed against the conductor line transverse to the traveling direction, the sensitive contacting between the sliding contacts and the longitudinal branches of the conductor line may become damaged. If the displaceable devices should be additionally displaced between several conductor lines at different locations as it is the case, e.g., with RTG cranes, damage may occur due to the protruding pantograph.

SUMMARY OF THE INVENTION

The present invention therefore is based on the objective of eliminating the above-described disadvantages and making available a current collector, as well as an energy transmission system, that allows an energy-saving, reliably contacting and non-damaging displacement of the current collector along a conductor line, as well as a simple connection of the current collector to the conductor line. Only low lateral forces should occur between the current collector and the conductor line, in particular, during the displacement of the current collector on the conductor line.

According to the invention, this objective is attained with a current collector having the characteristics of claim 1, as well as an energy transmission system having the characteristics of claim 13. Other embodiments of the invention are disclosed in the dependent claims.

According to the invention, the initially mentioned current collector, as well as the initially mentioned energy transmission system, is characterized by the at least one first lever assembly that is arranged between the current collector trolley and the displaceable device and features a first drive lever arm, the first end of which can be rotatably connected to the displaceable device and the second end of which is rotatably connected to a second end of at least one first tension lever arm, the second end of which is rotatably connected to the current collector trolley, wherein a first adjustment drive is provided in order to move the current collector trolley between a retracted position on the displaceable device and an extended position away from the displaceable device, and wherein a first locking device is provided in order to lock the first drive lever arm in a predetermined extended position when the displaceable device is displaced in the traveling direction. Due to this measure, the current collector trolley is advantageously pulled by the displaceable device via the first tension lever arm and only low lateral forces act upon the current collector trolley and the conductor line, i.e., transverse to the traveling direction. The first drive lever arm is advantageously locked as steep as possible, i.e., as far as possible transverse to the traveling direction, such that the angle between the first tension lever arm and the traveling direction becomes as small as possible. The inventive current collector and energy transmission system also allow a reliable connection with the conductor line if the displaceable device is not displaced exactly parallel to the guide element, but rather with variations. Alternatively, the first adjustment drive may also be arranged between the displaceable device and the first tension lever arm in order to lock the first tension lever arm at its distance from the displaceable device.

In an advantageous embodiment of the invention, a second lever assembly is provided that features a second drive lever arm, the first end of which can be rotatably connected to the displaceable device and the second end of which is rotatably connected to a second end of at least one second tension lever arm, the first end of which is rotatably connected to the current collector trolley, wherein the first lever assembly and the second lever assembly are arranged relative to one another in a pantograph arrangement. Due to this measure, the current collector trolley can be easily guided during the retraction and extension.

If a second locking device is provided in an advantageous additional development of this embodiment in order to lock the second drive lever arm in a predetermined extended position when the device is displaced opposite to the traveling direction, the current collector trolley can be pulled by the first tension lever arm during the displacement in the traveling direction and by the second tension lever arm during the displacement opposite to the traveling direction. In comparison with the preceding embodiment that features only the first locking device and in which the current collector trolley is pushed during the displacement opposite to the traveling direction, this provides the advantage that possible tilting of the current collector part can be avoided when it is pushed opposite to the traveling direction. It is also advantageous to lock the second drive lever arm as steep as possible in this case, i.e., as far as possible transverse to the traveling direction, such that the angle between the second tension lever arm and the traveling direction becomes as small as possible.

A second adjustment drive between the displaceable device and the second drive lever arm makes it possible to realize the retraction and extension of the current collector trolley in an exact and, in particular, symmetrically controlled fashion. The second adjustment drive may alternatively also be arranged between the displaceable device and the second tension lever arm in order to lock the second tension lever arm at its distance from the displaceable device. Alternatively, the first adjustment drive also may be advantageously arranged between the first drive lever arm and the second drive lever arm.

In an embodiment of the invention that is advantageous with respect to the operational technology, the first and/or the second adjustment drive may consist of a pneumatic cylinder and/or hydraulic cylinder. In this embodiment, the pneumatic and/or hydraulic cylinders may be realized in the form of a first and/or a second locking device such that a simple design of the locking device is achieved.

In another embodiment of the invention, a first flexible drawgear element, for example, in the form of a cable, a band, a chain, or the like is provided as a first locking device and is arranged on the displaceable device and on the first drive lever arm, wherein this first drawgear element is tensioned when the first drive lever arm is extended and the current collector is displaced in the traveling direction such that it pulls the current collector trolley. The drawgear element transmits only tensile forces, but no compressive forces. In an advantageous additional development of this embodiment, a second flexible drawgear element is provided as a second locking device and is arranged on the displaceable device and on the second drive lever arm, wherein this second drawgear element is tensioned when the second drive lever arm is extended and the current collector is displaced opposite to the traveling direction such that it pulls the current collector trolley. This embodiment, as well as the embodiment of the invention described hereafter, has the advantage that the adjustment drives can be switched off and therefore require no energy during the displacement of the displaceable device.

In another embodiment of the invention, a first and/or second locking device in the form of a first limit stop arranged on the first drive lever arm and a second limit stop arranged on the second drive lever arm may be provided, wherein the limit stop or the limit stops contact the displaceable device once the predetermined extended position of the respective drive lever arm is reached. This embodiment can be easily realized and makes it possible to easily lock the drive lever arm or drive lever arms.

The inventive energy transmission system is advantageously operated in such a way that the current collector trolley is initially extended transverse to the traveling direction from an idle position on the displaceable device toward the guide element of the conductor line by means of the adjustment drive or the adjustment drives, wherein the displaceable device is subsequently displaced in the traveling direction until the locking device locks the first drive lever arm in a predetermined extended position, and wherein the adjustment drive or the adjustment drives are then switched off.

BRIEF DESCRIPTION OF THE DRAWINGS

Advantageous embodiments and practical additional developments of the invention are described in greater detail below with reference to preferred exemplary embodiments that are illustrated in the attached drawings. In these drawings.

DETAILED DESCRIPTION OF THE INVENTION

Figure 1:
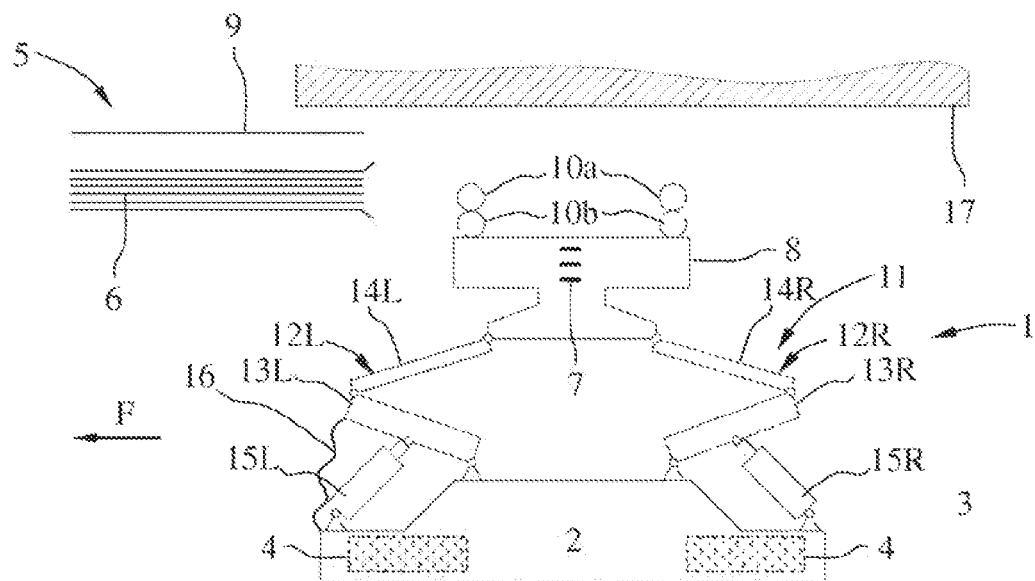
FIG. 1 shows a schematic top view of a first embodiment of an inventive energy transmission system with an inventive current collector in an idle position.

FIG. 1 shows a schematic top view of a first embodiment of an inventive energy transmission system with an inventive current collector 1 in an idle position.

The current collector 1 is mounted on a traveling pedestal of a crane 2 that can be displaced on the ground 3 in—and opposite to—a traveling direction F by means of an electric travel drive. In the drawings, the crane 2 is displaced on the ground 3 on graphically indicated rubber tires 4. The crane 2 may consist of a container-loading crane or an RTG crane.

Figure 3:
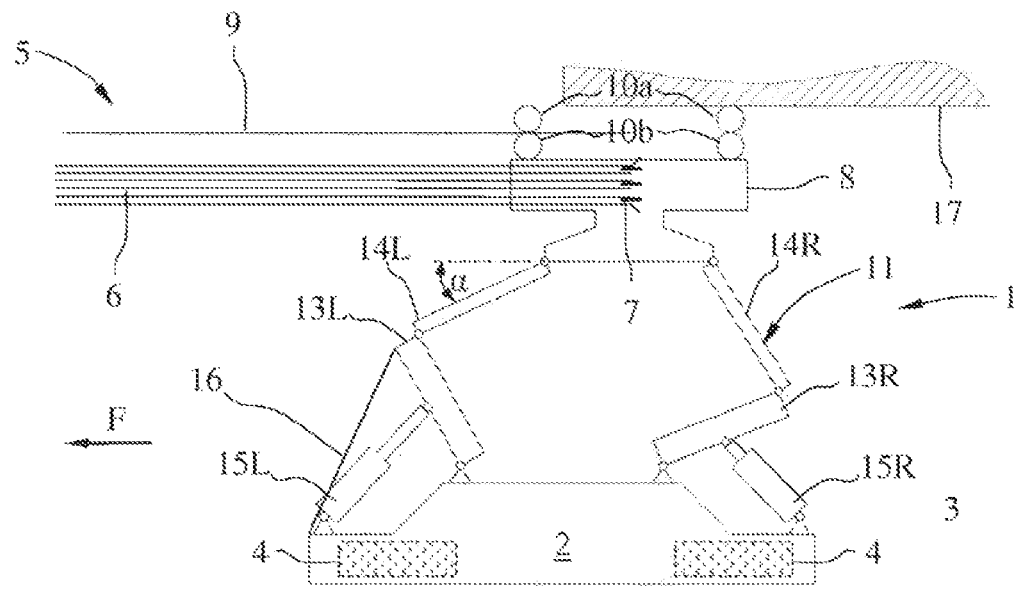
FIG. 3 shows the illustration of FIGS. 1 and 2 after the start-up of the displaceable load.
Figure 4:
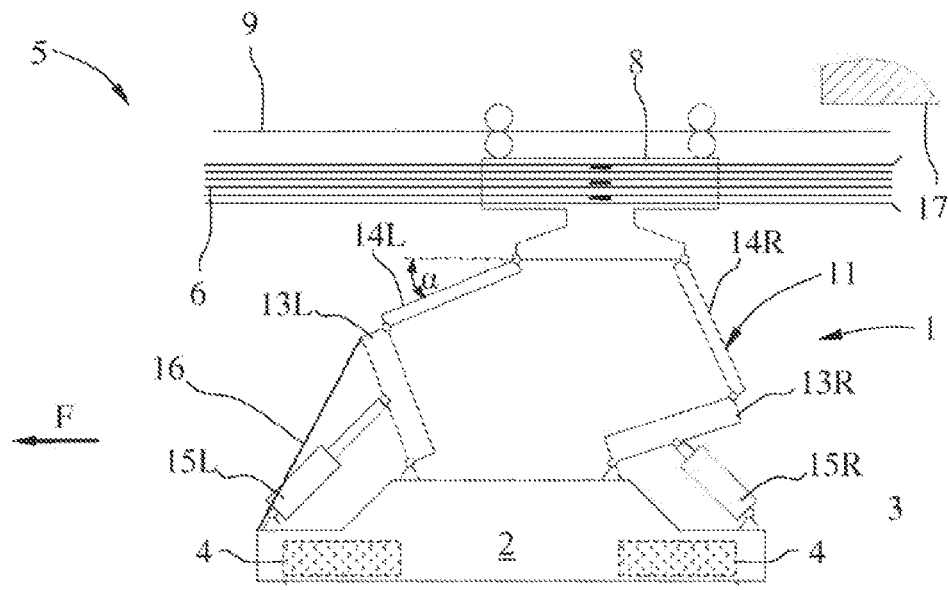
FIG. 4 shows the illustration of FIGS. 1-3 during the displacement of the displaceable load.

A generally known conductor line 5 is provided in order to supply the crane 2 with electric energy via the current collector 1. The conductor line 5 features a plurality of voltage-carrying or current-carrying line branches 6 that are merely indicated in FIGS. 1-4. In FIGS. 3 and 4, sliding contacts 7 of a current collector trolley 8 of the current collector 1 engage into the line branches 6 from above in order to supply the crane with electric energy. One example for such an energy transmission by means of a conductor line is disclosed in DE 196 47 336 A1, to which the present application hereby refers with respect to the design of the electric contacting between the line branches 6 and the sliding contacts 7.

According to FIGS. 3 and 4, the current collector trolley 8 is guided laterally, i.e., transverse to the traveling direction F of the current collector trolley 8, in the traveling mode on a guide element that is realized in the form of a guide rail 9 and arranged along the conductor line 5, namely by means of guide rollers 10. For this purpose, the guide rollers 10 feature outer guide rollers 10a and inner guide rollers 10b that encompass the guide rail 9 in the operational position (FIGS. 3 and 4). However, another suitable guide element may be provided instead of the guide rail 9 and the guide rollers 10 on the current collector trolley 8 may be replaced with other suitable guide means for laterally guiding the current collector trolley 8 along the conductor line 5.

Instead of the conductor lines described in the present exemplary embodiments, it would also be possible to use other types of corresponding energy transmission systems such as, for example, generally known conductor rail systems or current collectors that are guided on power lines. In the present context, it is essential that the current collector trolley 8 be guided along the energy transmission system on a guide element.

Figure 2:
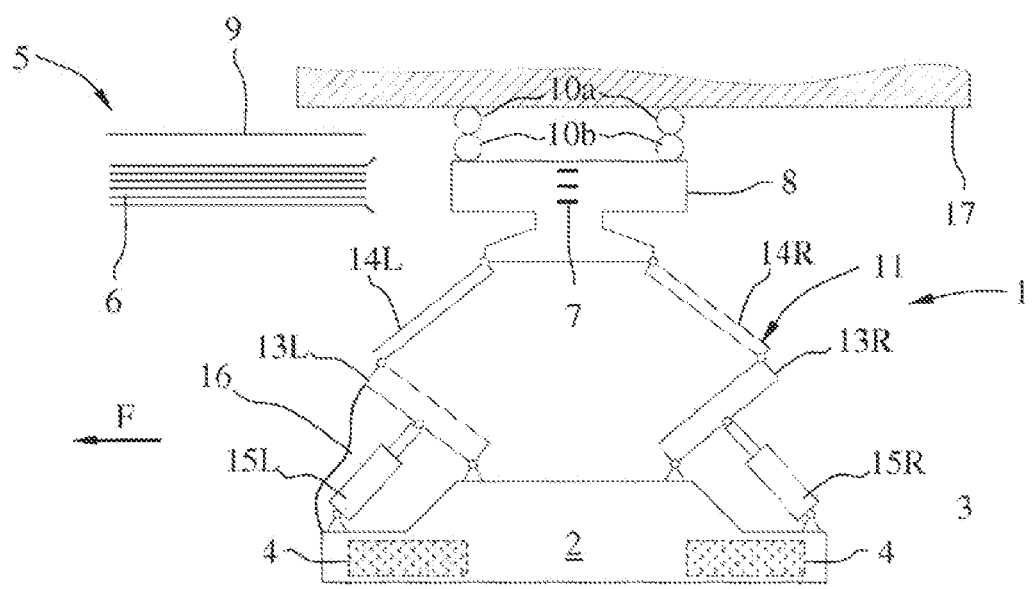
FIG. 2 shows the illustration of FIG. 1 with the current collector in an extended position.

Since the crane 2 not only features the electric travel drive, but also a travel drive in the form of an internal combustion engine, e.g., a diesel engine, the crane 2 can also move in the parking position illustrated in FIGS. 1 and 2 without connecting the current collector 1 to the electric conductor line 5. Instead of providing an internal combustion engine for traveling without a connection to the conductor line 5, it may also be advantageous to provide a buffer battery for the electric travel drive in order to bridge this short traveling distance.

A pantograph arrangement 11 with a first lever assembly 12L on the left side in FIG. 1 and a second lever assembly 12R on the right side in FIG. 1 is provided in order to displace the current collector trolley 8 from the retracted position illustrated in FIG. 1 into the extended position illustrated in FIG. 2. In the following description, the letter "L" added to the reference symbols refers to the left, first lever assembly 12L, and the letter "R" refers to the right, second lever assembly 12R.

The first lever assembly 12L features a first drive lever arm 13L that is rotatably coupled to the crane 2 with a first end. The first drive lever arm 13L is rotatably connected to a second end of a first tension lever arm 14L with its other second end. The other first end of the first tension lever arm 14L is rotatably coupled to the left region of the current collector trolley 8. In this case, the first lever assembly 12L is realized in such a way that the first ends of the first drive lever arm 13L and the first tension lever arm 14L lie, with respect to the traveling direction F, behind and to the right of the connected second ends of the first drive lever arm 13L and the first tension lever arm 14L in the parking or idle position illustrated in FIG. 1.

The second lever assembly 12R is essentially realized symmetric to the first lever assembly 12L and features a second drive lever arm 13R that is rotatably coupled to the crane 2 with a first end. The second drive lever arm 13R is rotatably connected to a second end of the second tension lever arm 14R with its other second end. The other second end of the second tension lever arm 14R is rotatably coupled to the right region of the current collector trolley 8. In this case, the second lever assembly 12L is realized in such a way that the first ends of the second drive lever arm 13L and the second tension lever arm 14L lie, with respect to the traveling direction F, in front and to the left of the connected second ends of the second drive lever arm 13L and the second tension lever arm 14L in the parking or idle position illustrated in FIG. 1.

The first drive lever arm 13L can be moved back and forth between the positions illustrated in FIGS. 1 and 2 about its rotary connection with the crane 2 by means of a first adjustment drive 15L that consists of a controllable pneumatic cylinder in this case. Likewise, the second drive lever arm 13R can be moved back and forth between the positions illustrated in FIGS. 1 and 2 about its rotary connection with the crane 2 by means of a second adjustment drive 15L that is also realized in the form of a controllable pneumatic cylinder.

Instead of being coupled to the crane 2, the first and the second drive lever arm 13L and 13R and/or the adjustment drives 15L, 15R may also be rotatably coupled to a base element that, in turn, is mounted on the crane 2.

In the exemplary embodiments illustrated in FIGS. 1-16, the rotational axes of the rotary connections respectively extend perpendicular to the plane of projection and the ground such that the motion of the lever arms and the pneumatic cylinders takes place parallel to the plane of projection. This is advantageous with respect to the manufacturing and operational technology, but the motions may also take place in other planes as long as a clear and defined positioning of the current collector trolley 8 on the guide rail 9 of the conductor line 5 and a reliable contacting of the sliding contacts 7 in the line branches 6 are ensured.

In order to minimize the lateral forces acting upon the conductor line 5 and the guide rail 9 when the crane 2 travels in the traveling direction F, a locking device for the first drive lever arm 13L in the form of a cable 16 is mounted between the front end of the crane 2 with respect to the traveling direction F which is situated on the left side in FIG. 1 and the second end of the first drive lever arm 13L. The function of this cable 16 is described in greater detail below with reference to FIGS. 1-4.

In FIG. 1, the crane 2 and the current collector 1 are in an idle or parking position without an electric connection to the conductor line 5. In this position, the crane 2 is displaced with the internal combustion engine only and the pneumatic cylinders 15L, 15R are operated with compressed air generated by the internal combustion engine or compressed air from a reservoir. An electronic and/or electric control arranged on the crane can be operated with a buffer battery.

When the crane 2 needs to be put into operation from the idle position illustrated in FIG. 1 and displaced along the rail arrangement 3, the two pneumatic cylinders 15L, 15R are initially extended such that the second ends of the drive lever arms 13L, 13R are moved toward one another. Due to the pantograph principle, the second ends of the first tension lever arms 14L, 14R are also moved toward one another such that their first ends are extended in the direction of a stationary stopping face 17 that essentially extends parallel to the conductor line 5 and the guide rail 9 transverse to the traveling direction F. Consequently, the current collector trolley 8 is also moved toward the stopping face 17 until the outer guide rollers 10a come in contact with this stopping face. The current collector 1 is now in the extended position illustrated in FIG. 2. The cable 16 is not yet tensioned.

Figure 7:
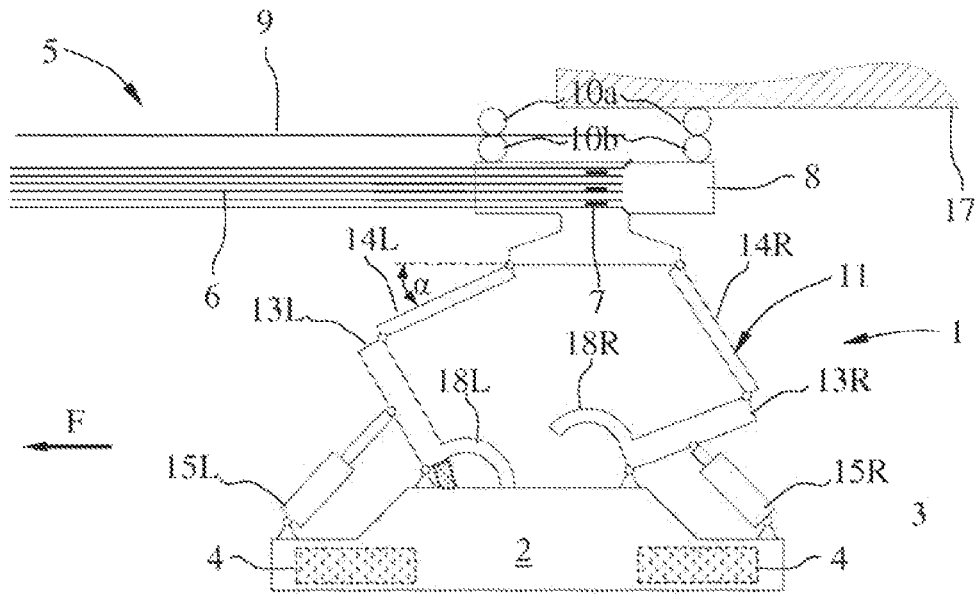
FIG. 7 shows the illustration of FIGS. 5 and 6 after the start-up of the displaceable load.
Figure 8:
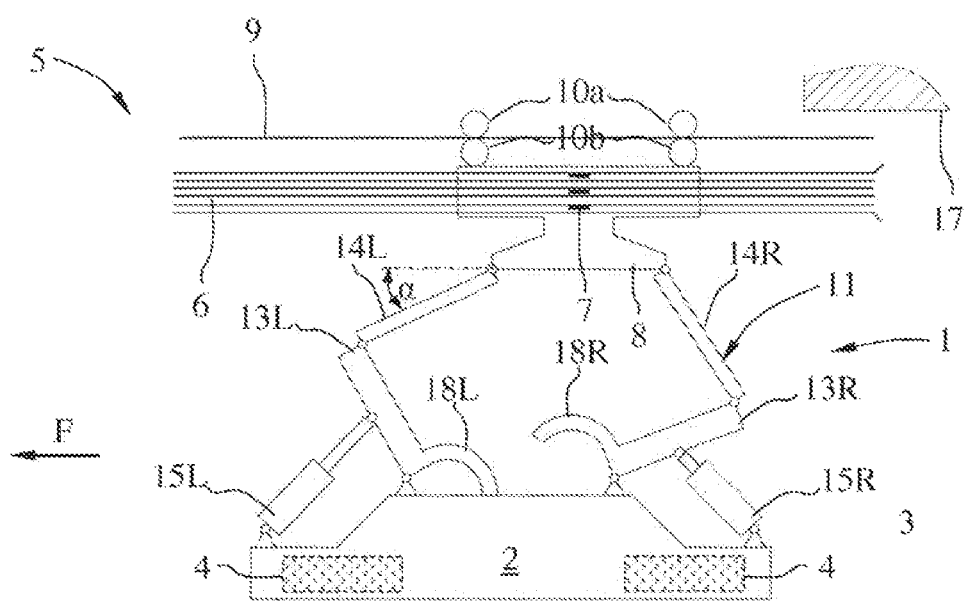
FIG. 8 shows the illustration of FIGS. 5-7 during the displacement of the displaceable load.
Figure 9:
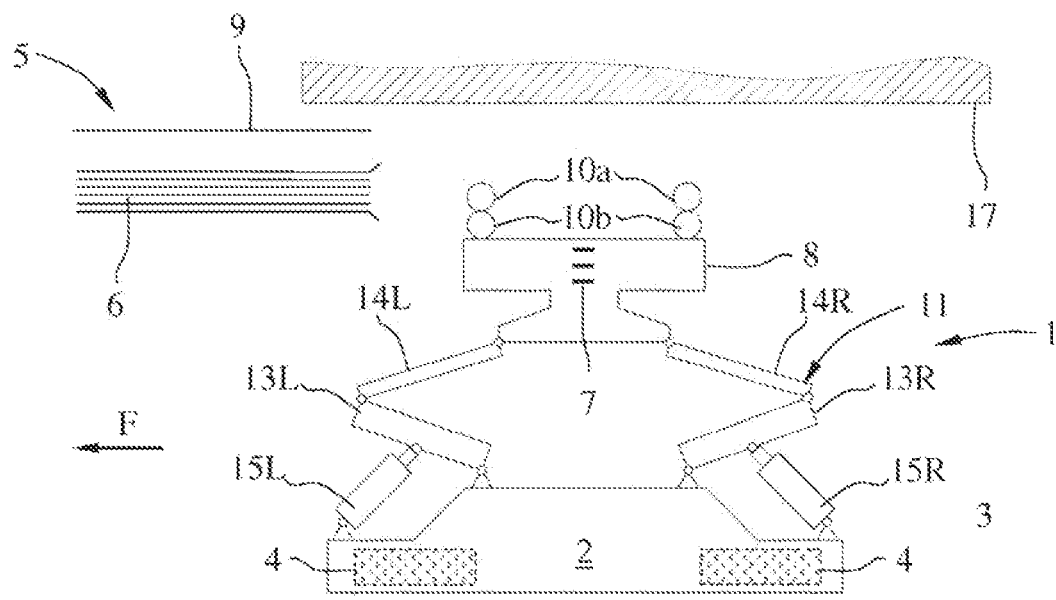
FIG. 9 shows a schematic top view of a third embodiment of an inventive energy transmission system with an inventive current collector in an idle position.
Figure 10:
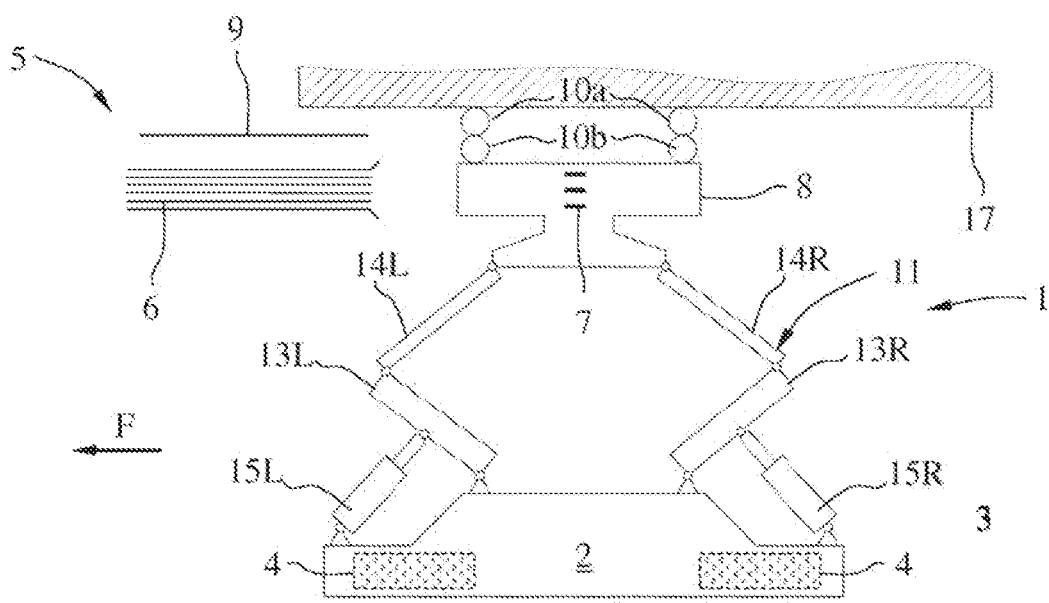
FIG. 10 shows the illustration of FIG. 9 with the current collector in an extended position.

Subsequently, the crane 2 travels toward the conductor line 5 in the traveling direction F by means of the internal combustion engine such that the left guide rollers 10a, 10b encompass the guide rail 9 as illustrated in FIG. 7. Subsequently, the connection to the line branches 6 is also produced by means of the sliding contacts 7 such that the electric travel drive can now be supplied via the conductor line. In order to save as much energy as possible, the pneumatic cylinders 15L and 15R are depressurized during the start of the movement toward the left from the position illustrated in FIG. 2 such that no pressing force presses the current collector trolley 8 against the stopping face 17 and only low friction-related lateral forces act in the direction of the conductor line 5.

Alternatively, it may be advantageous to act upon the pneumatic cylinders 15L, 15R with pressure until at least the front guide rollers 10a, 10b on the left side in FIG. 1 encompass the guide rail 9. In the safest alternative, the pneumatic cylinders 15L, 15R are acted upon with pressure until the right guide rollers 10a, 10b in FIG. 1 also encompass the guide rail 9.

Due to the depressurized pneumatic cylinders 15L, 15R, the frictional forces, in particular, between the guide rollers 10a and the stopping face 17 and the inertia of the current collector 1, the pantograph arrangement 11 initially buckles toward the right, opposite to the traveling direction F when the movement starts as illustrated in FIG. 3. However, an additional, complete buckling of the pantograph arrangement 11 is prevented due to the fact that the cable 16 is now tensioned. The first drive lever arm 13L is locked in its position illustrated in FIG. 3 and prevented from turning additionally in the clockwise direction due to the forces, particularly frictional forces, that act opposite to the traveling direction F, as well as the tensioned cable 16. The forces exerted upon the current collector trolley 8 by the traveling crane 2 are now transmitted to the current collector trolley 8 via the first tension lever arm 14L such that the pantograph arrangement 11 remains in this position during the further displacement (FIG. 4).

In order to maintain lateral forces acting upon the current collector 8 transverse to the traveling direction F as low as possible, it is therefore advantageous if the angle α according to FIG. 3 between the first tension lever arm 14L and the guide rail 9 or a straight line extending parallel thereto through the rotary joint between the current collector trolley 8 and the first tension lever arm 14L is as small as possible. The first tension lever arm 14L therefore primarily serves as a drawgear element in order to pull the current collector trolley 8 that is guided laterally and therefore in the transverse direction by the guide rollers 10a, 10b and the guide rail 9 in the traveling direction. This means that essentially only tensile forces are transmitted to the current collector trolley 8 while lateral forces in the direction away from the crane 2 or toward the crane are minimized. This represents a significant advantage over conventional pantograph-type current collectors because, among other things, the connection between the line branches 6 and the sliding contacts 7 is sensitive to transverse loads. Consequently, transverse loads of this type that could, for example, cause the sliding contacts 7 to break off or lead to faulty contacting of the sliding contacts 7 in the line branches 6 are prevented.

In order to correspondingly minimize the lateral forces exerted upon the conductor line 5 and the guide rail 9 when the crane 2 travels opposite to the traveling direction F, another locking device for the second drive lever arm 13L in the form of a cable may be mounted between the right end of the crane 2 in FIG. 1 that represents the rear end with respect to the traveling direction F and the second end of the second drive lever arm 13R. The function of this right cable corresponds to the above-described function of the left cable 16, however, when the crane 2 travels opposite to the traveling direction F.

FIGS. 5-8 show a schematic top view of a second embodiment of an inventive energy transmission system with an inventive current collector 8 [sic], wherein this second embodiment essentially can be distinguished from the embodiment illustrated in FIGS. 1-4 by the design of the locking device. In the following description, identical components are therefore identified by the same reference symbols and the essential differences are described.

Figure 5:
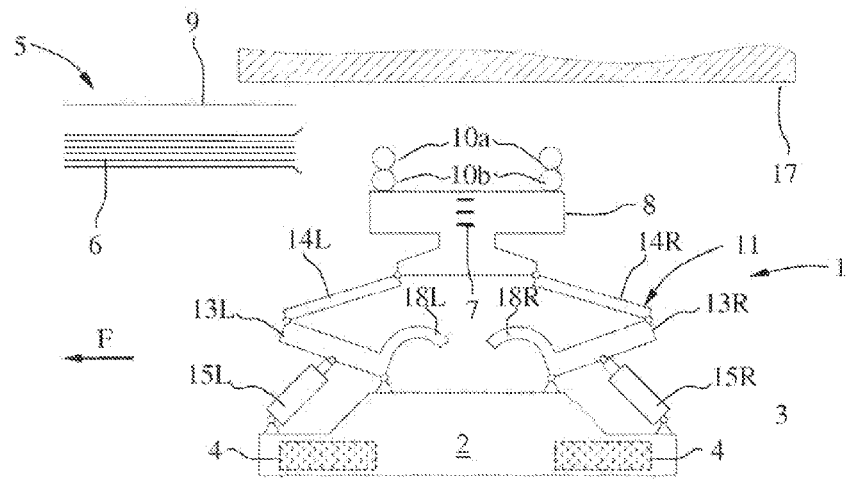
FIG. 5 shows a schematic top view of a second embodiment of an inventive energy transmission system with an inventive current collector in an idle position.
Figure 6:
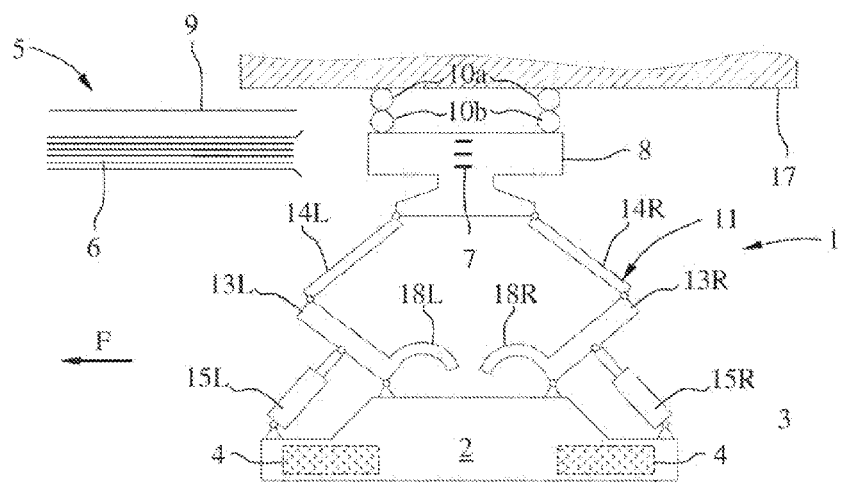
FIG. 6 shows the illustration of FIG. 5 with the current collector in an extended position.

In the exemplary embodiment illustrated in FIG. 5, a limit stop 18L in the form of an arm with the shape of a ring segment is provided on the first end of the first drive lever arm 13L that is coupled to the crane 2. When the crane 2 starts to move in the traveling direction F while the pneumatic cylinder 15L is depressurized, the limit stop 18L contacts the crane 2 at the angle of the rotational movement of the first drive lever arm 13L shown in FIG. 7, i.e., it defines the position of the first drive lever arm 13L. This once again results in the adjustment of the desired angle α between the guide rail 9 and the first tension lever arm 14L that also primarily serves as a means for transmitting tension in this case.

Accordingly, a second, right limit stop 18R may also be provided for traveling opposite to the traveling direction F. The limit stop may also be realized with a design different from that of the arm-shaped limit stops 18L, 18R, for example, in the form of a limit stop element between the crane 2 and the lower end of the first and the second drive lever arm 13L, 13R as indicated in a dotted fashion in FIG. 7.

This inventive embodiment of the current collector and the energy transmission system also makes it possible to depressurize the pneumatic cylinders 15L, 15R after the guide rollers 10a, 10b are threaded into the guide rail 9 such that additional energy does not have to be constantly generated during the displacement. The current collector trolley is primarily pulled along the guide rail 9 such that the occurring lateral forces can be minimized.

The alternative embodiment of the invention illustrated in FIGS. 9-12 once again can essentially be distinguished from the embodiments illustrated in FIGS. 1-8 by the design of the locking device.

Figure 11:
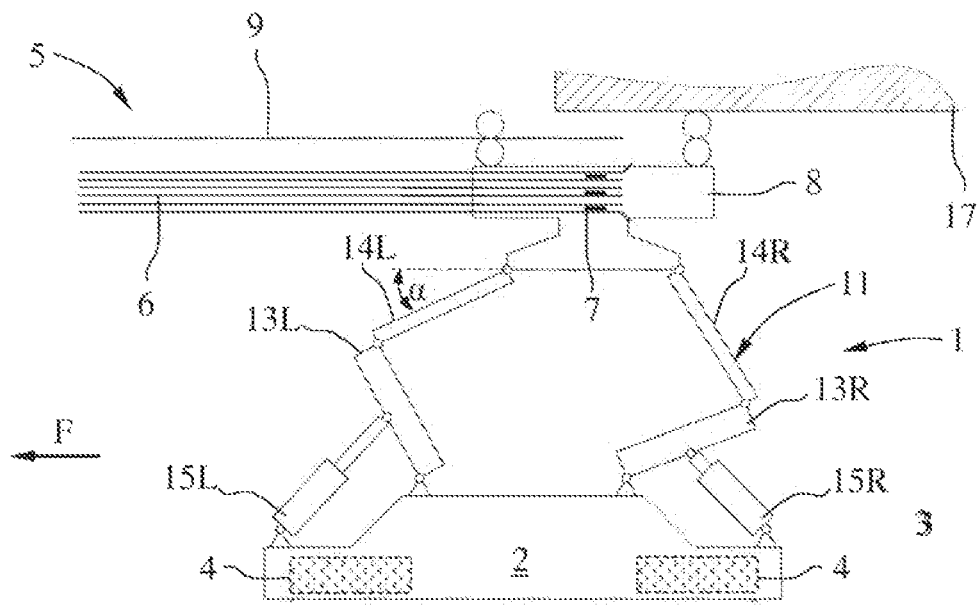
FIG. 11 shows the illustration of FIGS. 9 and 10 after the start-up of the displaceable load.
Figure 12:
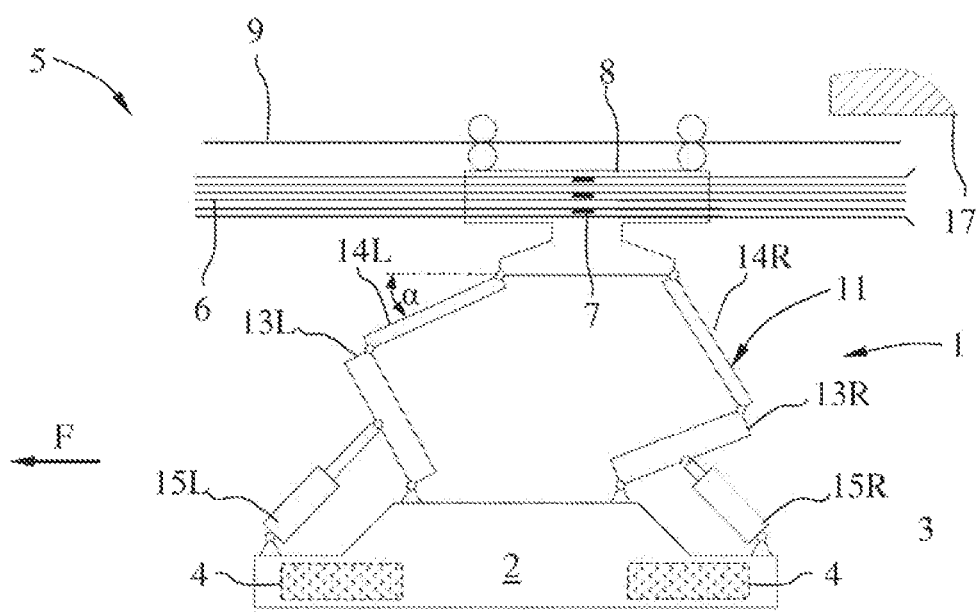
FIG. 12 shows the illustration of FIGS. 9-11 during the displacement of the displaceable load.
Figure 13:
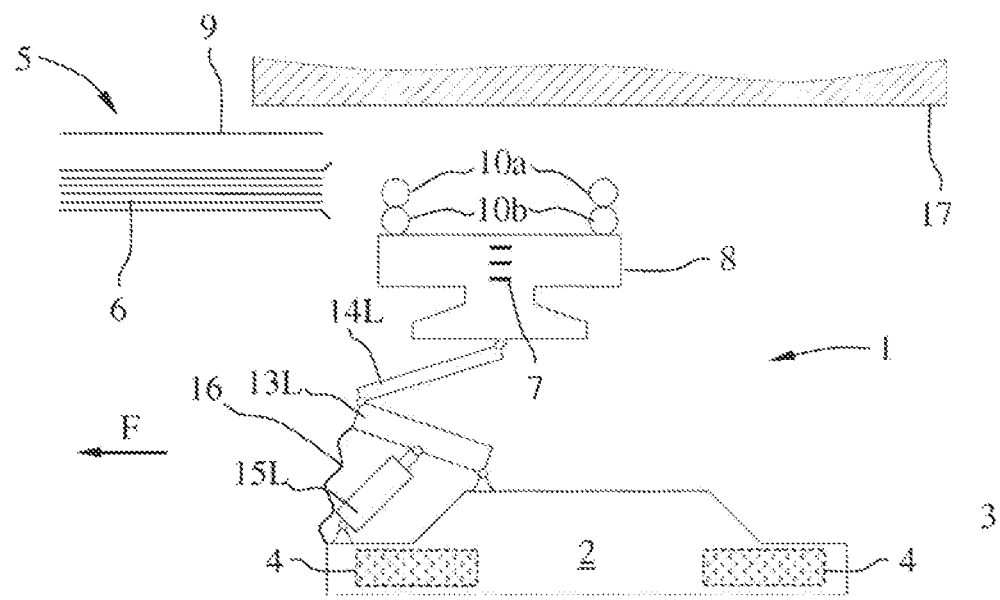
FIG. 13 shows a schematic top view of a fourth embodiment of an inventive energy transmission system with an inventive current collector in an idle position.
Figure 14:
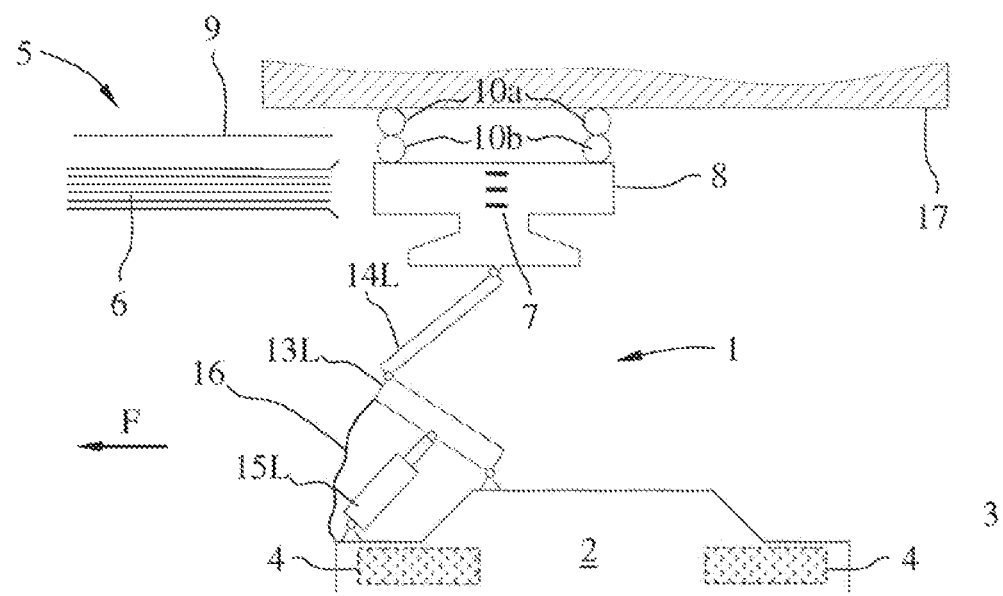
FIG. 14 shows the illustration of FIG. 13 with the current collector in an extended position.
Figure 15:
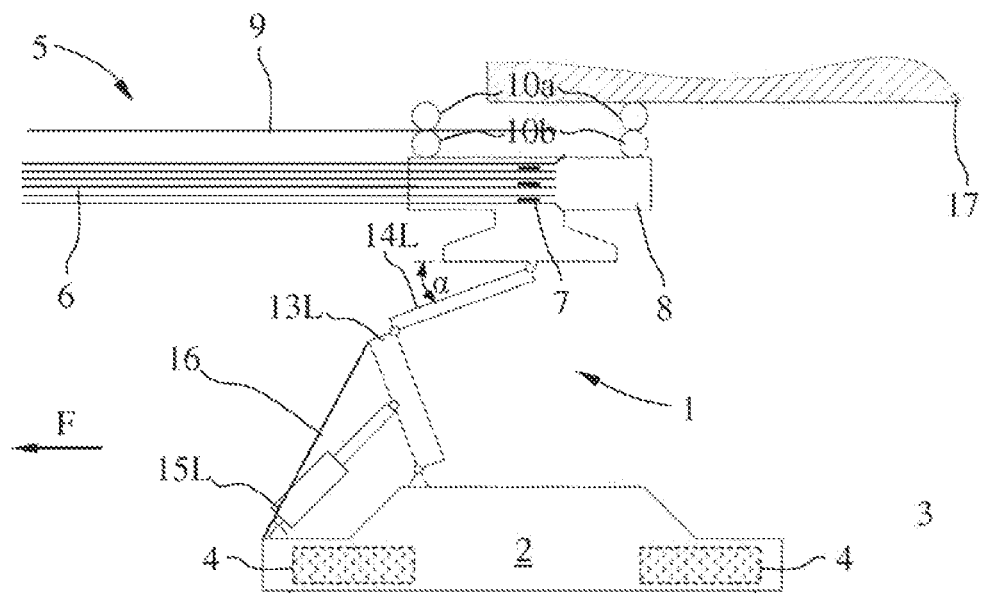
FIG. 15 shows the illustration of FIGS. 13 and 14 after the start-up of the displaceable load.
Figure 16:
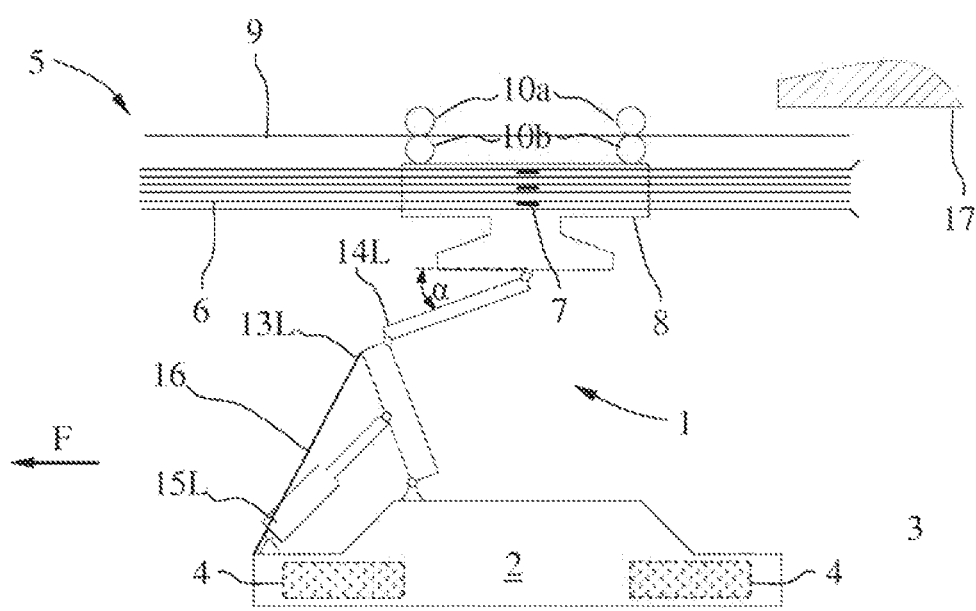
FIG. 16 shows the illustration of FIGS. 13-15 during the displacement of the displaceable load.

In the embodiment of the invention illustrated in FIGS. 9-12, the locking device is realized in that the pneumatic cylinder 15L of the first drive lever arm 13L with respect to the traveling direction F is locked in the position illustrated in FIG. 11. In contrast, the second pneumatic cylinder 15R that represents the rear pneumatic cylinder with respect to the traveling direction is depressurized such that the front first drive lever arm 13L also remains stationary in this case and the left first tension lever arm 14L essentially transmits tensile forces to the current collector trolley 8. This current collector trolley also is essentially pulled along the guide rail 9 in this case while hardly any lateral forces are exerted thereupon. Vice versa, the second pneumatic cylinder 15R is locked in a corresponding position while the first pneumatic cylinder 15L is depressurized when the crane 2 travels opposite to the traveling direction F.

The embodiment of the invention illustrated in FIGS. 13-16 can be distinguished from the embodiment according to FIGS. 1-4 in that only the left first lever assembly 12L is provided in this case and the right second lever assembly 12R illustrated in FIGS. 1-4 is eliminated. In this case, the function also corresponds to the function of the embodiment according to FIGS. 1-4, wherein the lever assembly 12L is in this case realized with an additional holding device such that the current collector trolley 8 can be moved transverse to the traveling direction F between the retracted position illustrated in FIG. 13 and the extended position illustrated in FIG. 16 essentially parallel to the guide rail 9. Holding devices of this type are already known from the prior art. In this embodiment, the locking device may also be realized in the form of a cable 16, a limit stop according to FIGS. 5-8, or the pneumatic cylinder 15L according to FIGS. 9-12.

In another alternative embodiment of the invention, only an adjustment drive arranged between the current collector trolley 8 and the crane 2 may be provided instead of the pneumatic cylinder 15L or the two pneumatic cylinders 15L, 15R. This adjustment drive ensures the retraction and extension of the current collector trolley 8 and is depressurized when the extended position of the current collector trolley 8 on the stopping face 17 is reached such that one of the above-described locking devices once again locks the first or the second drive lever arm 13L, 13R depending on whether the crane 2 travels in—or opposite to—the traveling direction F.

The different types of locking devices described above may also be combined with one another such that, for example, a cable 16 is provided on the first lever assembly 12L and a limit stop 18R is provided on the second lever assembly 12R.

The invention claimed is:

1. A current collector for a device that can be displaced along a conductor line in—and opposite to—a traveling direction, the current collector comprising a current collector trolley displaceable along a guide element of the conductor line in a guided fashion and at least one first lever assembly between the current collector trolley and the displaceable device, the at least one first lever assembly including a first drive lever arm, the first end of which can be rotatably connected to the displaceable device and the second end of which is rotatably connected to a second end of at least one first tension lever arm, the first end of which is rotatably connected to the current collector trolley, wherein a first adjustment drive is provided to move the current collector trolley between a retracted position on the displaceable device and an extended position away from the displaceable device, wherein a first locking device is provided to lock the first drive lever arm in a predetermined extended position when the displaceable device is displaced in the traveling direction and wherein a first flexible draw gear element is provided as the first locking device and arranged on the displaceable device and on the first drive lever arm, wherein the draw gear element is tensioned when the first drive lever arm is extended and the current collector is displaced in the traveling direction.

2. The current collector according to claim 1, wherein the first adjustment drive is arranged between the displaceable device and the current collector trolley.

3. The current collector according to claim 1, wherein the first adjustment drive is arranged between the displaceable device and the first drive lever arm or the first tension lever arm.

4. The current collector according to claim 1, wherein a second lever assembly is provided and features a second drive lever arm, the first end of which can be rotatably connected to the displaceable device and the second end of which is rotatably connected to a second end of at least one second tension lever arm, the second end of which is rotatably connected to the current collector trolley, wherein the first lever assembly and the second lever assembly are arranged relative to one another in a pantograph arrangement.

5. The current collector according to claim 4, wherein a second locking device is provided in order to lock the second drive lever arm in a predetermined extended position when the device is displaced opposite to the traveling direction.

6. The current collector according to claim 4, wherein a second adjustment drive is arranged between the displaceable device and the second drive lever arm or the second tension lever arm.

7. The current collector according to claim 4, wherein the first adjustment drive or the second adjustment drive is arranged between the first drive lever arm and the second drive lever arm.

8. The current collector according to claim 1, wherein the first adjustment drive includes pneumatic cylinders and/or hydraulic cylinders.

9. The current collector according to claim 8, wherein the pneumatic and/or hydraulic cylinder or cylinders are realized in the form of a locking device.

10. The current collector according to claim 1, wherein a second flexible drawgear element is provided as a second locking device and arranged on the displaceable device and on the second drive lever arm, wherein this drawgear element is tensioned when the second drive lever arm is extended and the current collector is displaced opposite to the traveling direction.

11. An energy transmission system with comprising: a conductor line, a device that can be displaced along the conductor line in—and opposite to—a traveling direction, a current collector with a current collector trolley displaceable along a guide element of the conductor line in a guided fashion and at least one first lever assembly between the current collector trolley and the displaceable device, the at least one first lever assembly including a first drive lever arm, the first end of which can be rotatably connected to the displaceable device and the second end of which is rotatably connected to a second end of at least one first tension lever arm, the first end of which is rotatably connected to the current collector trolley, wherein a first adjustment drive is provided to move the current collector trolley between a retracted position on the displaceable device and an extended position away from the displaceable device, wherein a first locking device is provided to lock the first drive lever arm in a predetermined extended position when the displaceable device is displaced in the traveling direction, wherein a first flexible draw gear element is provided as the first locking device and arranged on the displaceable device and on the first drive lever arm, wherein the draw gear element is tensioned when the first drive lever arm is extended and the current collector is displaced in the traveling direction.

\* \* \* \* \*